(12) United States Patent
Du et al.

(10) Patent No.: US 9,466,142 B2
(45) Date of Patent: Oct. 11, 2016

(54) FACIAL MOVEMENT BASED AVATAR ANIMATION

(71) Applicant: Intel Corporation, Santa Clara, CA (US)

(72) Inventors: Yangzhou Du, Beijing (CN); Wenlong Li, Beijing (CN); Xiaofeng Tong, Beijing (CN); Wei Hu, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,271

(22) PCT Filed: Dec. 17, 2012

(86) PCT No.: PCT/CN2012/086739
§ 371 (c)(1),
(2) Date: Jun. 23, 2013

(87) PCT Pub. No.: WO2014/094199
PCT Pub. Date: Jun. 26, 2014

(65) Prior Publication Data
US 2014/0218371 A1     Aug. 7, 2014

(51) Int. Cl.
| | | |
|---|---|---|
| G06T 13/00 | (2011.01) | |
| G06T 13/80 | (2011.01) | |
| H04N 7/15 | (2006.01) | |
| G06K 9/00 | (2006.01) | |
| G06T 13/40 | (2011.01) | |

(52) U.S. Cl.
CPC ............ G06T 13/80 (2013.01); G06K 9/00315 (2013.01); G06T 13/40 (2013.01); H04N 7/157 (2013.01)

(58) Field of Classification Search
USPC .......................................................... 345/473
See application file for complete search history.

(56) References Cited

U.S. PATENT DOCUMENTS

| | | | |
|---|---|---|---|
| 5,736,982 A * | 4/1998 | Suzuki et al. | 715/706 |
| 7,643,683 B2 * | 1/2010 | Miller | 382/190 |
| 2004/0201666 A1 | 10/2004 | Matsuo et al. | |
| 2005/0280660 A1 * | 12/2005 | Seo et al. | 345/629 |

FOREIGN PATENT DOCUMENTS

| | | |
|---|---|---|
| CN | 1832604 A | 9/2006 |
| CN | 101997958 A | 3/2011 |
| CN | 102170361 A | 8/2011 |

OTHER PUBLICATIONS

M. Boker, J. F. Cohn, B.-J. Theobald, I. Matthews, T. R. Brick and J. R. Spiesaff "Effects of damping head movement and facial expression in dyadic conversation using real-time facial expression tracking and synthesized avatars", Philosoph. Trans. B Roy. Soc., vol. 364, No. 1535, pp. 3485-3495 Dec. 2009.*
J. P. Ewins, M. D. Waller, M. White, and P. F. Lister, "Mip-map level selection for texture mapping", IEEE Trans. Visual. Comput. Graphics, vol. 4, pp. 317-329 Dec. 1998.*
Pighin et al., Synthesizing realistic facial expressions from photographs, Dec. 2006, SIGGRAPH '06 ACM SIGGRAPH 2006 Courses, Article No. 19, pp. 1-10.*
International Search Report and Written Opinion received for PCT Patent Application No. PCT/CN2012/086739, mailed on Sep. 26, 2013, 10 pages.

* cited by examiner

*Primary Examiner* — Barry Drennan
*Assistant Examiner* — Robert Craddock
(74) *Attorney, Agent, or Firm* — Barnes & Thornburg LLP (57) ABSTRACT

Avatars are animated using predetermined avatar images that are selected based on facial features of a user extracted from video of the user. A user's facial features are tracked in a live video, facial feature parameters are determined from the tracked features, and avatar images are selected based on the facial feature parameters. The selected images are then displayed are sent to another device for display. Selecting and displaying different avatar images as a user's facial movements change animates the avatar. An avatar image can be selected from a series of avatar images representing a particular facial movement, such as blinking. An avatar image can also be generated from multiple avatar feature images selected from multiple avatar feature image series associated with different regions of a user's face (eyes, mouth, nose, eyebrows), which allows different regions of the avatar to be animated independently.

15 Claims, 8 Drawing Sheets

610 SELECT PREDETERMINED AVATAR FEATURE IMAGES FROM PLURALITIES OF PREDETERMINED AVATAR FEATURE IMAGES BASED AT LEAST IN PART ON FACIAL FEATURE PARAMETERS DETERMINED FROM VIDEO OF A USER

620 GENERATE AVATAR IMAGE BASED AT LEAST IN PART ON SELECTED PREDETERMINED AVATAR FEATURES IMAGES

630 PROVIDE AVATAR IMAGE INFORMATION FOR DISPLAY

710 SELECT PREDETERMINED AVATAR IMAGE FROM PLURALITY OF PREDETERMINED AVATAR IMAGES BASED ON FACIAL FEATURE PARAMETERS DETERMINED FROM USER VIDEO

720 DISPLAY SELECTED AVATAR IMAGE AT DISPLAY OF FIRST COMPUTING DEVICE OR SEND SELECTED AVATAR IMAGE TO SECOND COMPUTING DEVICE

FIG. 9

FACIAL MOVEMENT BASED AVATAR ANIMATION

BACKGROUND

Users can be represented in software applications and various platforms, such as gaming or social media platforms, by an avatar. Some of these avatars can be animated.

DETAILED DESCRIPTION

The technologies described herein allow avatars to be animated in real time based on a user's facial or head movements (hereinafter, collectively referred to as "facial movements"). A user's facial features are tracked in live video of the user, and facial feature parameters determined from the tracked features are mapped to predetermined avatar images. The disclosed avatar animation technologies consume less power than approaches that comprise generating or deforming a complex 3D avatar model based on a user's facial movements and rendering an avatar image based on such a model. Accordingly, the battery life of mobile computing devices employing the disclosed technologies can be extended relative to devices that use more computationally intensive approaches.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to cover all modifications, equivalents, and alternatives within the scope of the claims.

Figure 1:
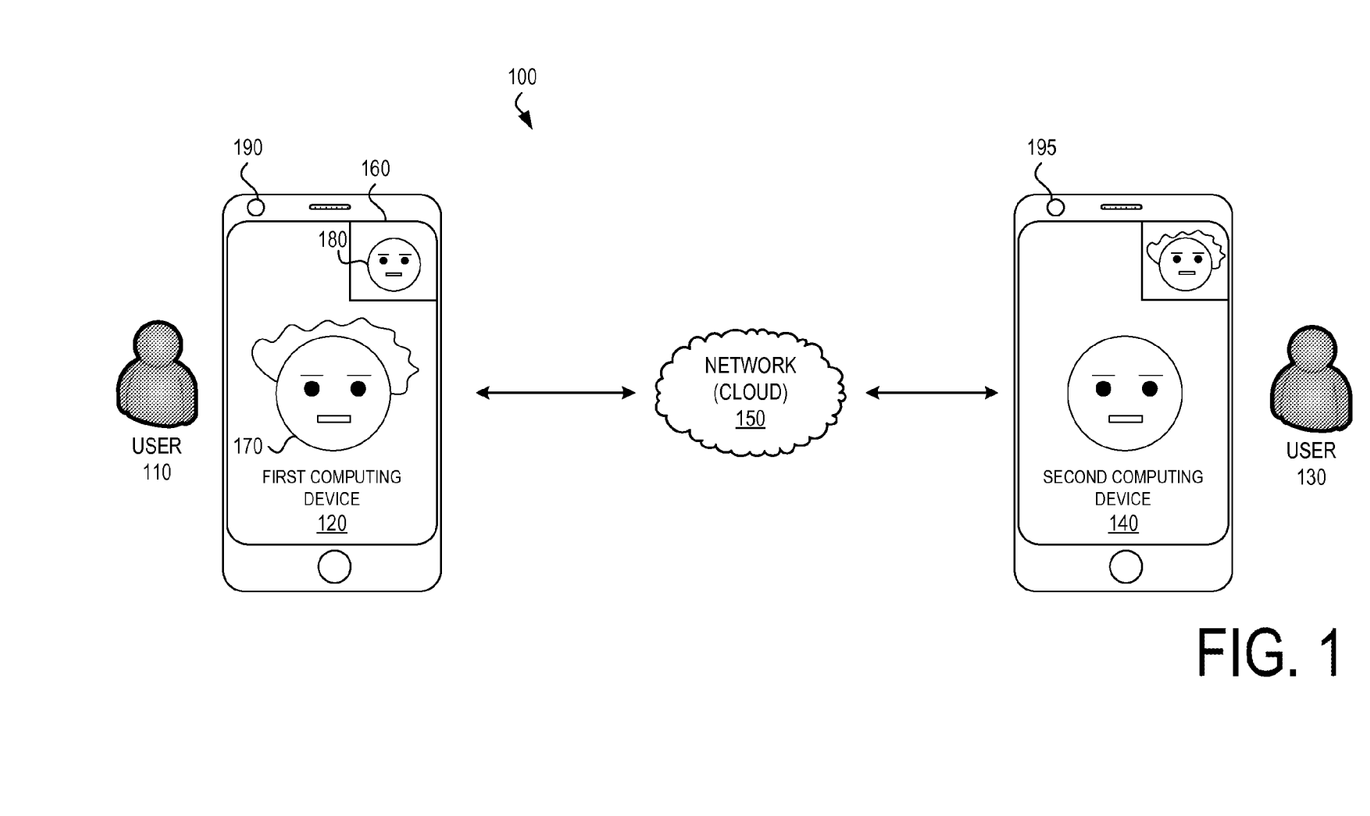
FIG. 1 is a diagram of an exemplary environment in which technologies described herein can be implemented.

FIG. 1 is a diagram of an exemplary environment 100 in which technologies described herein can be implemented. The environment 100 comprises a first user 110 using a first computing device 120 to communicate with a second user 130 using a second computing device 140 via a network (or cloud) 150 via a video call or videoconference. The first and second computing devices 120 and 140 can be any computing device, such as a mobile device (e.g., smartphone, laptop or tablet computer), desktop computer or server; and the network 150 can be any type of network such as a Local Area Network (LAN), Wide Area Network (WAN) or the Internet.

A user interface 160 of a video call application running on the first computing device 120 can comprise an avatar image 170 of the second user 130 that occupies a majority of the user interface 160. Optionally, the user interface 160 can also comprise an avatar image 130 of the user 110 that occupies a smaller portion of the interface. The avatar images 170 and 180 are based on facial features of the users 110 and 130 extracted from live video of the users to allow for real time communication between the parties. That is, video frames are made available for video avatar animation processing as soon as they are generated by a video capture device. In some embodiments, where real time communication between users is not required, an avatar can be animated based on stored video captured at any previous time.

Video can be provided to a computing device by, for example, a camera integrated into the computing device, such as a front-facing camera integrated into a smartphone (e.g., cameras 190 and 195) or tablet computer, or an external video capture device communicatively coupled with the computing device, such as a wireless camcorder coupled to a laptop or a web camera coupled to a desktop computer.

In general, avatars are animated based on facial feature parameters determined from facial features tracked in video of a user. Exemplary facial features include the position of the upper and lower lips, upper and lower eyelids, mouth corners, left and right eyebrows (inside end, middle and outside end), chin, left and right ears, nose tip and left and right nose wing. Exemplary facial feature parameters include the degree of head rotation, degree of head tilt, distance between upper and lower lips, distance between mouth corners, distance between upper lip and nose tip, distance between nose wing and nose tip, distance between upper and lower eyelids, distance between eyebrow tips and distance between eyebrow tip and eyebrow middle. Facial features and facial feature parameters can be tracked and determined in addition to those listed above.

Determined facial feature parameters are used to select predetermined avatar images for animating an avatar. The avatar images are predetermined in that they have been generated before a user's facial feature parameters are determined from a video. The predetermined avatar images can come pre-installed on a purchased computing device or installed at the device after purchase. Avatar images can be installed after purchase by, for example, downloading a communication application that supports avatar animation using techniques described herein or by downloading avatar images separately. In addition, avatar images can be provided by another computing device. For example, avatar images can be provided to a computing device by a remote computing device with which the computing device is in communication. For instance, avatar images can be provided by a remote computing device as part of setting up a video call or during the video call.

Predetermined avatar images can take various forms. For example, they can be simple cartoon images or images generated from sophisticated 3D models created using professional rendering engines. The predetermined avatar images are also typically stored locally at a computing device. This allows for the quick provision of avatar images to other resources at the computing device and to other computing devices, such as remote computing devices participating in a video call with the computing device.

In some embodiments, an avatar is animated by selecting an avatar image from one or more series of avatar images based at least in part on facial features parameters determined from video of a user. As a user's facial features change in a video due to the user's changing facial movements, different avatar images are selected and displayed, resulting in an animated avatar whose appearance corresponds to the facial movements of the user. The manners in which an avatar can be animated can be based on the series of avatar images available to a computing device.

Figure 2:
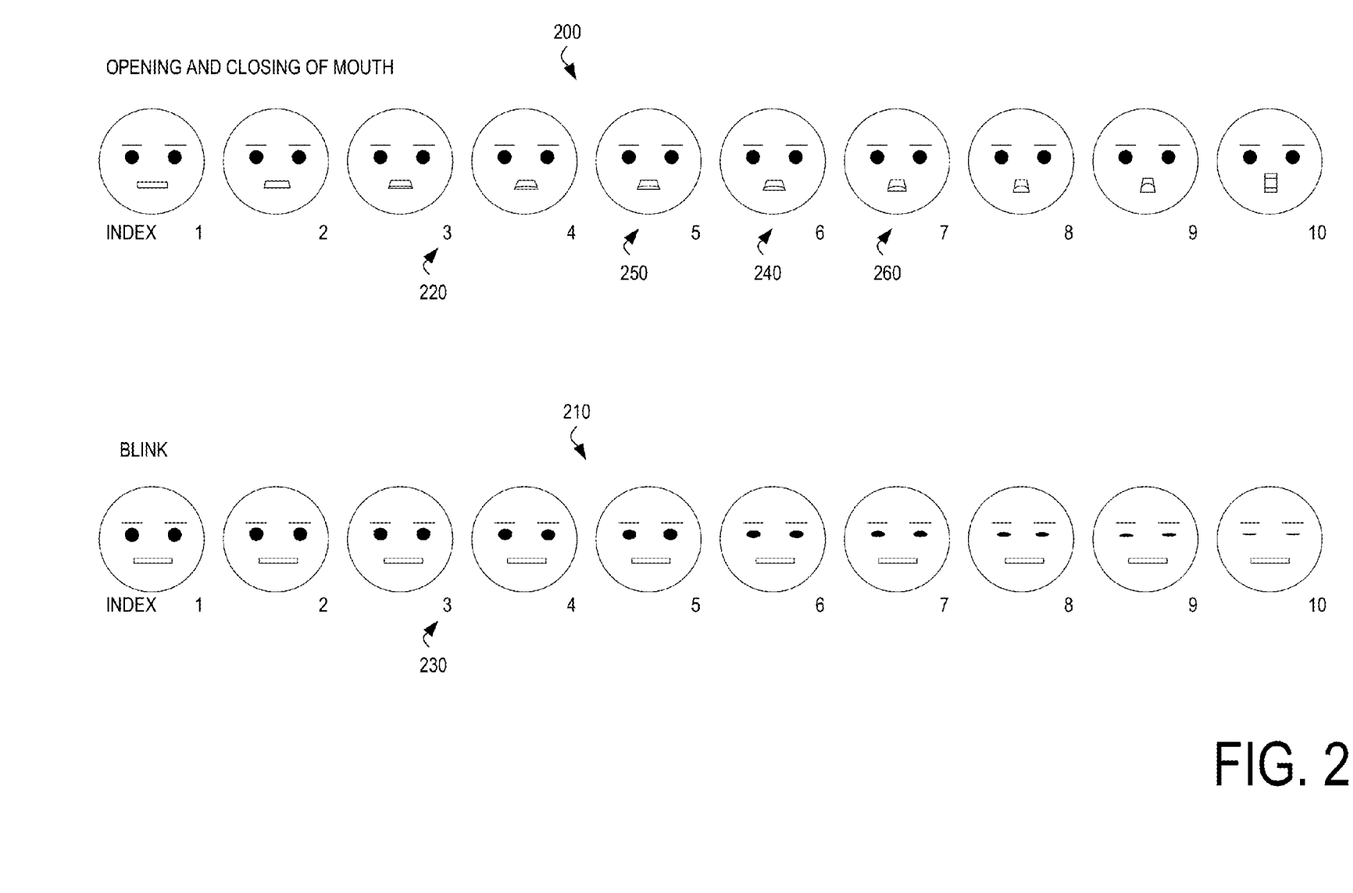
FIG. 2 illustrates two exemplary avatar images series for animating an avatar's face.

FIG. 2 illustrates two exemplary avatar image series 200 and 210 for animating an avatar. Series 200 can be used to animate the opening and closing of an avatar's mouth and series 210 can be used to animate an avatar blinking. Series 200 and 210 each comprise ten avatar images having corresponding indices 220 and 230, respectively. An avatar image series (or avatar feature image series, as discussed below) can comprise any number of images. The number of images in a series can be based on, for example, a desired level of animation smoothness and a desired amount of memory that avatar image series can occupy. In general, the facial features tracked in a particular implementation of the disclosed technologies can be based on the avatar images series available to the device. For example, if a computing device only has access to the series 200 and 210, the device may only track facial features relating to the mouth and eyes.

Selecting an avatar image in a series can comprise mapping one or more facial feature parameters to an image index. For example, the distance between a user's upper and lower lips can be mapped to one of the indices 220 of series 200. Various mapping approaches can be used. One exemplary mapping comprises normalizing a facial feature parameter to a range of zero to one and then performing a linear mapping of the normalized parameter to a series index. For example, the distance between a user's upper and lower lips can be normalized to a range of zero to one and then rounded up to the nearest tenth to generate an index for the series 200. In some embodiments, an index can be generated based on two or more facial features parameters. For example, a combination of the distance between a user's upper and lower lips and the distance between the corners of the user's mouth can be mapped to an index of the series 200.

Accordingly, an avatar can be animated to open and close its mouth by successively displaying adjacent avatar images in the series 200 in increasing order by index value, and then successively in decreasing order by index value. As used herein, the term "adjacent" as it refers to an avatar image in a series means an image that is the next or preceding image in the animation sequence represented by the series. For example, with reference to avatar image series 200, avatar image 240 is adjacent to avatar images 250 and 260. However, it is not necessary that adjacent avatar images be displayed in succession. For example, a displayed avatar animation could comprise avatar image 260 (index=7) being displayed immediately after avatar image 250 (index=5) is displayed.

Additional avatar images series can be used to animate an avatar with facial movements other than blinking and opening and closing its mouth. For example, avatar images series can be used to make an avatar yawn, smile, wink, raise its eyebrows, frown, etc.

In some embodiments, an avatar is animated using one avatar image series at a time. For example, if a computing device has access to avatar image series 200 and 210, the avatar can be made to blink or to open and close its mouth, but cannot be made to do both simultaneously. In other embodiments, an avatar image series can animate multiple facial movements. For example, the series 200 and 210 can be combined to create an avatar image series comprising 100 avatar images corresponding to combinations of the ten mouth images in the series 200 with the ten eye images in the series 210. Such an expanded avatar image series can be used to animate an avatar that can blink and open and close its mouth at the same time. Avatar image series can animate more than two facial expressions.

If a computing device has access to more than one avatar images series that animate the same region of the face (e.g., two series that can animate the mouth—one series that animates a smile and one series that animates a frown), the computing device can select which series to use to animate the avatar based on determined facial feature parameters. For example, a vertical distance between the mouth corners and the lower lip can be used to determine if the user is smiling or frowning.

In some embodiments, multiple series of avatar feature images can be used to animate various regions of an avatar independently. Each avatar feature image series corresponds to one region of an avatar's face (eyes, eyebrows, nose, mouth, etc.). In such embodiments, an avatar image can be generated by combining the avatar feature images selected from the avatar feature image series. An avatar feature image can be selected from a series based on facial feature parameters associated with the facial region corresponding with the series. In some embodiments, selected avatar feature images can be combined with an avatar background (e.g., an image of a face missing one or more parts) to generate an avatar image. Utilizing multiple series of avatar feature images allows for independent animation of multiple regions of an avatar's face without the need for a single avatar image series containing a large number of images.

Figure 3:
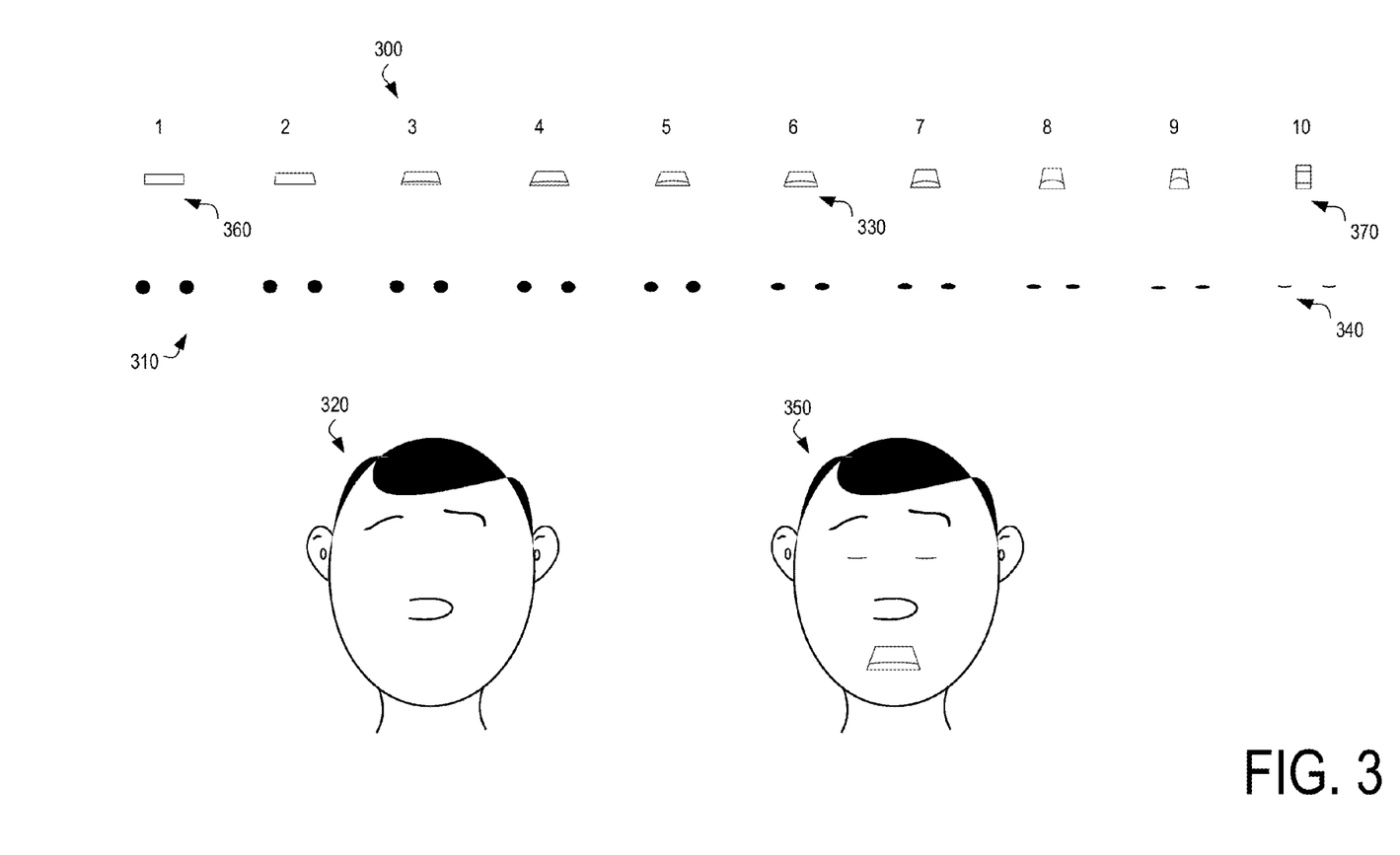
FIG. 3 illustrates two exemplary avatar feature image series and an avatar background.

FIG. 3 illustrates two exemplary avatar feature image series 300 and 310 and an avatar background 320. The series 300 and 310 can be used to independently animate the mouth and eyes of an avatar. The series 300 can be used to animate an avatar's mouth opening and closing, and the series 310 can be used to animate an avatar's eyes blinking. The avatar background 320 comprises an image of an avatar face without the eyes and mouth. An avatar image to be presented in an animation can be generated by selecting an avatar feature image from series 310 based on, for example, the distance between a user's upper and lower eyelids, selecting an avatar feature image from series 300 based on, for example, the distance between the upper and lower lips, and combining the selected avatar feature images with the avatar background 320. For instance, if, at a particular moment in time in a video, the determined distance between a user's upper and lower lips is mapped to index six of the series 300 and the determined distance between the user's upper and lower eyelids is mapped to index ten of the series 310, selected avatar feature images 330 and 340 can be combined with the avatar background 320 to generate the avatar image 350.

In some embodiments, separate avatar feature image series can be used to independently animate the left and right eyebrows and the left and right eyes. Moreover, a single image series can comprise images used to animate different facial movements for a facial region. For example, a single avatar feature image series for animating an avatar's mouth can be used to making the avatar yawn, smile, grin, frown, or make the mouth movements associated with a language's phonemes. Such a more complex avatar feature image series can correspond to a plurality of facial features parameters.

Figure 4:
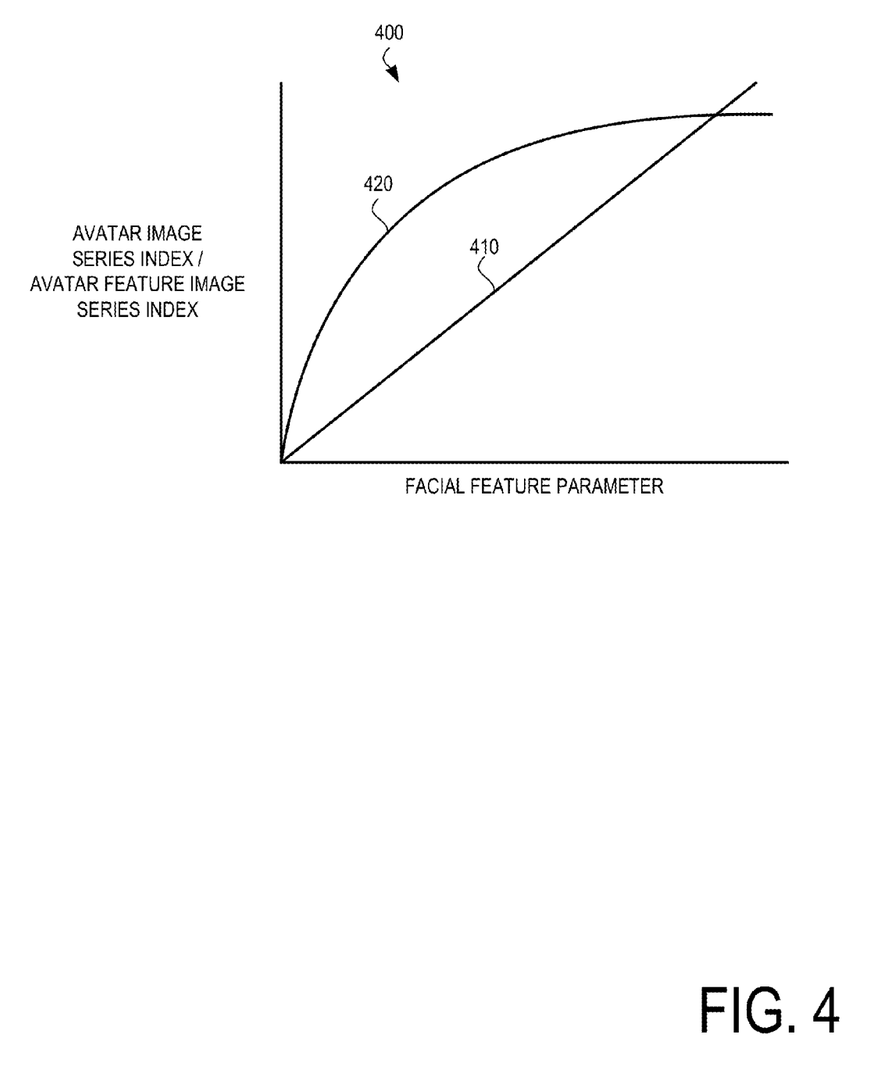
FIG. 4 shows a graph illustrating exemplary linear and nonlinear relationships between a facial feature parameter and an index to an avatar image series or an avatar feature image series.

FIG. 4 shows a graph 400 illustrating exemplary linear and nonlinear relationships, via curves 410 and 420, respectively, between a facial feature parameter (or a combination of multiple facial feature parameters) and an index to an avatar image series or an avatar feature image series. In some embodiments, the mapping can be nonlinear to emphasize movement of avatar features. For example, consider the avatar feature image series 300 used for animating the opening and closing of an avatar's mouth. Although the images range from a closed mouth (image 360) to a fully opened mouth (image 370), during typical conversation a user's mouth movements may not vary over this entire range. Thus, a linear mapping can result in the user's mouth movements being mapped to a relatively narrow range of indices, such as two through six, in series 300. Using a non-linear mapping, such as the mapping represented by curve 420, the mouth movements made by a user during a typical conversation can be made to map to a wider range of indices (e.g. one through eight in series 300) to emphasize mouth movement in the avatar.

Avatar image information sent by one computing device to another computing device for the purposes of animating an avatar can take various forms. For example, in some embodiments, avatar image information can comprise an avatar image for each frame in an avatar animation sequence. The avatar images can be sent in a known image file format (e.g., .jpg, .tiff, .bmp) or other format. In some embodiments, if the receiving computing device has access to an avatar image series associated with the avatar to be animated, the avatar image information can comprise an index into an avatar image series. The receiving device can then retrieve the appropriate avatar image from the series for display at the receiving device. Avatar image information can also comprise identifiers of avatar image series.

In other embodiments, avatar image information can comprise one or more indices to one or more avatar feature image series, and the receiving computing device can combine the avatar feature images associated with the indices into an avatar image for display at a receiving computing device display. Avatar image information can also comprise an indicator for an avatar background to be combined with avatar feature images. In various embodiments, avatar image information can comprise facial feature parameters determined from video and the receiving computing device can map the received parameters to an avatar image or one or more avatar feature images.

In some embodiments, avatar image information can be sent to a second computing device via an intermediate computing device, such as a cloud-based server. For example, a cloud-based server that is part of a videoconferencing service can receive avatar image information from a computing device being used by a first participant to the videoconference, and distribute the avatar image information to other participants to the videoconference.

In some embodiments, a user's avatar is animated at a display of the computing device that tracked the user's facial features video and/or determined facial feature parameters from the tracked facial features. For example, with reference to FIG. 1, the first computing device 120 generates video of the user 110 with camera 190, tracks the user's facial features, determines facial feature parameters based on the tracked features and presents an animated avatar 180 of the user 110 in the user interface 160 of the first device. In some embodiments, avatar image information is not sent to another computing device. For example, a gaming console may animate a user's game avatar based on a user's facial movements captured by a depth camera connected to the gaming console. The gaming console can present the animated game avatar in a display connected to the gaming console, such as a television.

Figure 5:
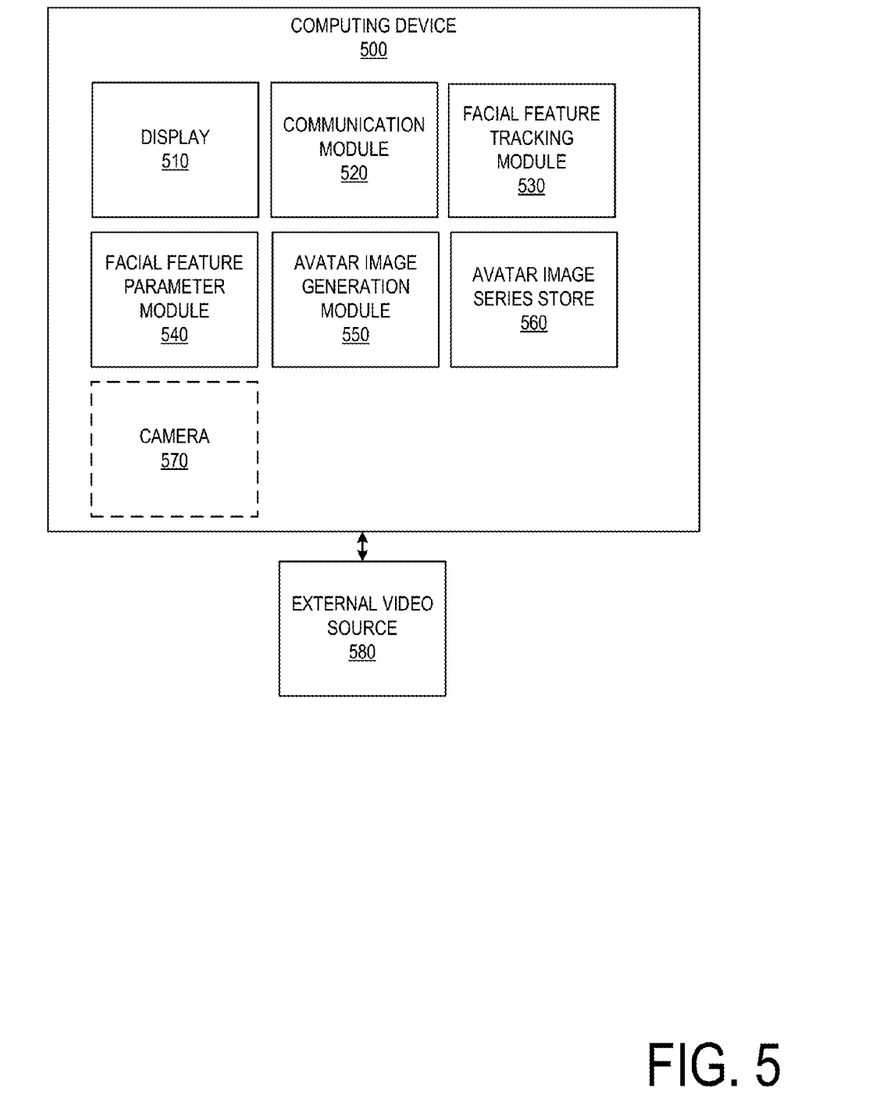
FIG. 5 is a block diagram of a first exemplary computing device for animating an avatar.

FIG. 5 is a block diagram of a first exemplary computing device 500 for animating an avatar. The computing device 500 comprises a display 510, a communication module 520 to send avatar image information to another computing device, a facial feature tracking module 530 to track facial features in video of a user, a facial feature parameter module 540 to determine facial feature parameters from tracked facial features, an avatar image generation module 550, and an avatar image series store 560 to store avatar image series and/or avatar feature images series.

The avatar image generation module 550 can select avatar images or avatar feature images from image series base don determined facial feature parameters. The avatar image generation module 550 can also select multiple avatar feature images from multiple avatar feature image series and combine the selected avatar feature images with an avatar background to generate an avatar image. The avatar image generation module 550 can further provide the selected or generated avatar image for display, at, for example, the computing device 500 or another computing device. Optionally, the computing device can comprise a video camera 570 to capture video of a user. In some embodiments, the computing device 500 receives video from an external video source 580, such as a web camera or a cloud-based video source.

It is to be understood that FIG. 5 illustrates one example of a set of modules that can be included in a computing device. In other embodiments, a computing device can have more or fewer modules than those shown in FIG. 5. Further, modules shown as separate in FIG. 5 can be combined into a single module, or a single module shown in FIG. 5 can be split into multiple modules. Moreover, any of the modules shown in FIG. 5 can be part of the operating system of the computing device 500, one or more software applications independent of the operating system, or operate at another software layer. The modules shown in FIG. 5 can be implemented in software, hardware, firmware or combinations thereof. A computer device referred to as being programmed to perform a method can be programmed to perform the method via software, hardware, firmware or combinations thereof.

Figure 6:
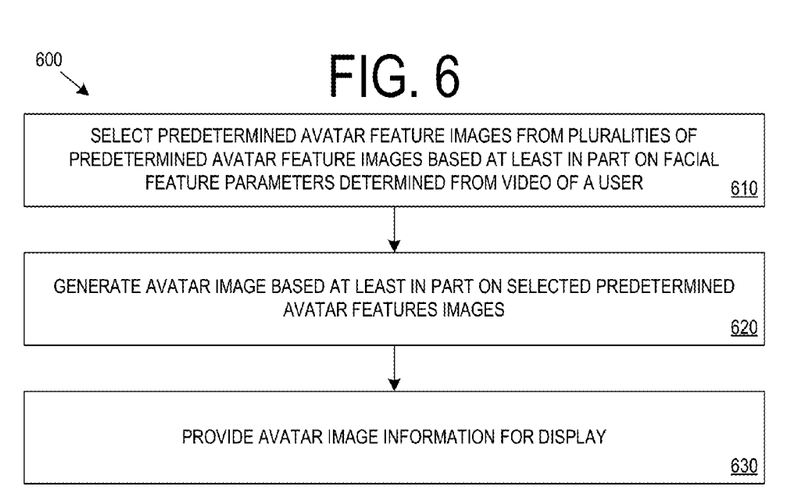
FIG. 6 is a flowchart of a first exemplary avatar animation method.

FIG. 6 is a flowchart of a first exemplary avatar animation method 600. The method 600 can be performed by for example, a smartphone running a video call application in which the user is represented by an avatar on the display of a remote computing device being used by another party to the call. The avatar tracks the user's facial movements and the smartphone stores multiple avatar feature image series to animate the avatar's eyebrows, left and right eyes and mouth independently. At a process act 610, one or more predetermined avatar feature images are selected from one or more pluralities of predetermined avatar feature images using a first computing device based at least in part on one or more facial feature parameters determined from video of a user. In the example, the smartphone selects an avatar feature image for the eyebrows, the left eye, the right eye and the mouth, based on facial feature parameters determined from video of the user captured by the smartphone's integrated camera. At a process act 620, an avatar image is generated based at least in part on the one or more selected predetermined avatar feature images. In the example, the smartphone combines the selected eyebrow, left eye, right eye and mouth avatar feature images with an avatar background image associated with the user to generate an avatar image. At a process act 630, avatar image information is provided for display. In the example, the avatar image is provided to smartphone display re sources for display of the avatar in a portion of the smartphone's display so that the user can see how his avatar is animated for other parties to the call. The smartphone also provides the avatar image to the computing device of the other party to the call.

Figure 7:
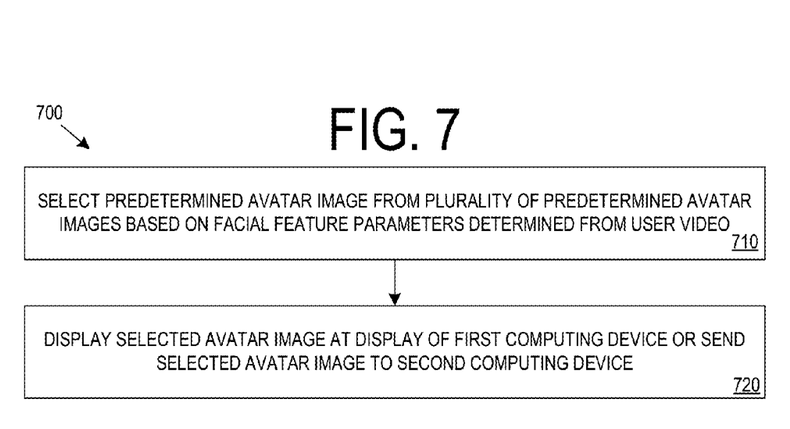
FIG. 7 is a flowchart of a second exemplary avatar animation method.

FIG. 7 is a flowchart of a second exemplary avatar animation method 700. The method 700 can be performed by, for example, a tablet computer executing a video call application in which the user is represented by an avatar on the display of a remote computing device operated by the other party to the video call. The avatar tracks the user's facial movements and the smartphone stores multiple avatar image series used to animate the avatar. The various avatar image series animate various facial movements of the user, such as smiling, frowning and blinking. At a process act 710, a predetermined avatar image is selected from a plurality of predetermined avatar images at a first computing device based at least in part on one or more facial feature parameters determined from video of a user. In the example, an avatar image is selected from an avatar image series used to make the avatar smile, based on facial features parameters determined by video of the user captured by the tablet computer's integrated camera. At a process act 720, the selected avatar image is displayed at a display of the first computing device or avatar image information is sent to a second computing device. In the example, the tablet sends the selected avatar image to the second computing device.

The technologies described herein have at least the following exemplary advantages. The use of predetermined avatar images to animate an avatar provides a lower power avatar animation option relative to animation approaches that generate or deform a 3D avatar model on the fly based on tracked facial features or that use a sophisticated 3D rendering engine to generate the avatar image to be presented at a display. By avoiding such computationally expensive approaches, the technologies described herein can also generate avatar animation more quickly. Although avatar animation has been discussed primarily in the context of video call applications, the described technologies can be used in any scenarios where avatars are or can be animated, such as in gaming applications (e.g., console-based application or massively multiplayer online role-playing games).

The technologies described herein can be performed by any of a variety of computing devices, including mobile devices (such as smartphones, handheld computers, tablet computers, laptop computers, media players, portable gaming consoles, cameras and video recorders), non-mobile devices (such as desktop computers, servers, stationary gaming consoles, smart televisions) and embedded devices (such as devices incorporated into a vehicle). As used herein, the term "computing devices" includes computing systems and includes devices comprising multiple discrete physical components.

Figure 8:
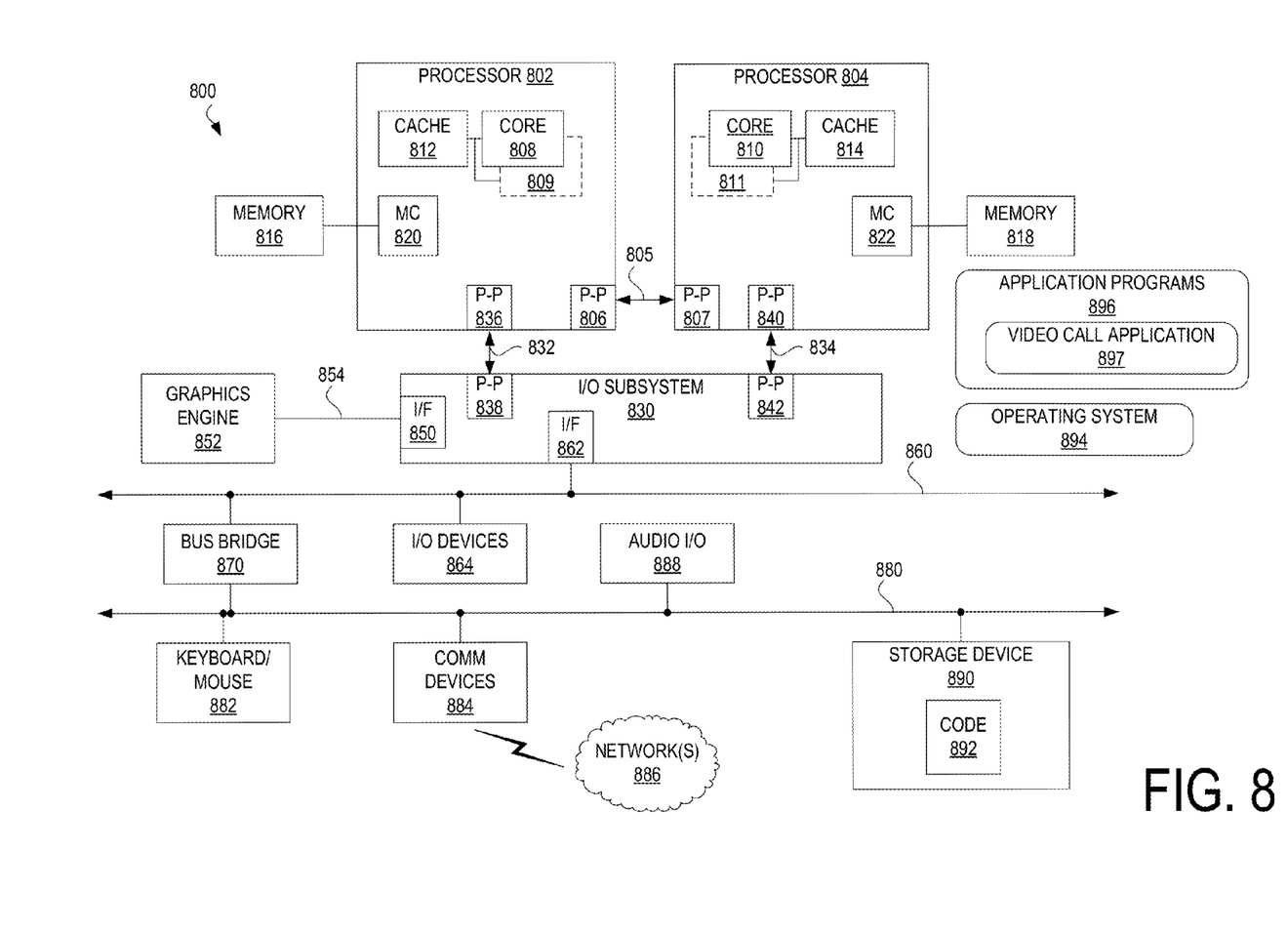
FIG. 8 is a block diagram of a second exemplary computing device for animating an avatar.

FIG. 8 is a block diagram of a second exemplary computing device 800 for animating an avatar. Generally, components shown in FIG. 8 can communicate with other shown components, although not all connections are shown, for ease of illustration. The device 800 is a multiprocessor system comprising a first processor 802 and a second processor 804 and is illustrated as comprising point-to-point (P-P) interconnects. For example, a point-to-point (P-P) interface 806 of the processor 802 is coupled to a point-to-point interface 807 of the processor 804 via a point-to-point interconnection 805. It is to be understood that any or all of the point-to-point interconnects illustrated in FIG. 8 can be alternatively implemented as a multi-drop bus, and that any or all buses illustrated in FIG. 8 could be replaced by point-to-point interconnects.

As shown in FIG. 8, the processors 802 and 804 are multicore processors. Processor 802 comprises processor cores 808 and 809, and processor 804 comprises processor cores 810 and 811. Processor cores 808-811 can execute computer-executable instructions in a manner similar to that discussed below in connection with FIG. 9, or in other manners.

Processors 802 and 804 further comprise at least one shared cache memory 812 and 814, respectively. The shared caches 812 and 814 can store data (e.g., instructions) utilized by one or more components of the processor, such as the processor cores 808-809 and 810-811. The shared caches 812 and 814 can be part of a memory hierarchy for the device 800. For example, the shared cache 812 can locally store data that is also stored in a memory 816 to allow for faster access to the data by components of the processor 802. In some embodiments, the shared caches 812 and 814 can comprise multiple cache layers, such as level 1 (L1), level 2 (L2), level 3 (L3), level 4 (L4), and/or other caches or cache layers, such as a last level cache (LLC).

Although the device 800 is shown with two processors, the device 800 can comprise only one processor or more than two processors. Further, a processor can comprise one or more processor cores. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, the device 800 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 802 and 804 reside in the same die package.

Processors 802 and 804 further comprise memory controller logic (MC) 820 and 822. As shown in FIG. 8, MCs 820 and 822 control memories 816 and 818 coupled to the processors 802 and 804, respectively. The memories 816 and 818 can comprise various types of memories, such as volatile memory (e.g., dynamic random access memories (DRAM), static random access memory (SRAM)) or non-volatile memory (e.g., flash memory). While MCs 820 and 822 are illustrated as being integrated into the processors 802 and 804, in alternative embodiments, the MCs can be logic external to a processor, and can comprise one or more layers of a memory hierarchy.

Processors 802 and 804 are coupled to an Input/Output (I/O) subsystem 830 via P-P interconnections 832 and 834. The point-to-point interconnection 832 connects a point-to-point interface 836 of the processor 802 with a point-to-point interface 838 of the I/O subsystem 830, and the point-to-point interconnection 834 connects a point-to-point interface 840 of the processor 804 with a point-to-point interface 842 of the I/O subsystems 30. Input/Output subsystem 830 further includes an interface 850 to couple I/O subsystem 830 to a graphics engine 852, which can be a high-performance graphics engine. The I/O subsystem 830 and the graphics engine 852 are coupled via a bus 854. Alternately the bus 844 could be a point-to-point interconnection.

Input/Output subsystem 830 is further coupled to a first bus 860 via an interface 862. The first bus 860 can be a Peripheral Component Interconnect (PCI) bus, a PCI Express bus, another third generation I/O interconnection bus or any other type of bus.

Various I/O devices 864 can be coupled to the first bus 860. A bus bridge 870 can couple the first bus 860 to a second bus 880. In some embodiments, the second bus 880 can be a low pin count (LPC) bus. Various devices can be coupled to the second bus 880 including, for example, a keyboard/mouse 882, audio I/O devices 888 and a storage device 890, such as a hard disk drive, solid-state drive or other storage device for storing computer-executable instructions (code) 292. The code 292 comprises computer-executable instructions for performing technologies described herein. Additional components that can be coupled to the second bus 880 include communication device(s) 884, which can provide for communication between the device 800 and one or more wired or wireless networks 886 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device 800 can comprise removable memory such flash memory cards (e.g., SD (Secure Digital) cards), memory sticks, Subscriber Identity Module (SIM) cards). The memory in device 800 (including caches 812 and 814, memories 816 and 818 and storage device 890) can store data and/or computer-executable instructions for executing an operating system 894 and application programs 296. Example data includes web pages, text messages, images, sound files, video data, avatar image series, avatar feature images series, avatar backgrounds or other data sets to be sent to and/or received from one or more network servers or other devices by the device 800 via one or more wired or wireless networks, or for use by the device 800. The device 800 can also have access to external memory (not shown) such as external hard drives or cloud-based storage.

The operating system 894 can control the allocation and usage of the components illustrated in FIG. 8 and support one or more application programs 896. The application programs 896 can include common mobile computing device applications (e.g., email applications, calendars, contact managers, web browsers, messaging applications) as well as other computing applications, such as a video call application 897 that animates user avatars based on a user's facial features.

The device 800 can support various input devices, such as a touch screen, microphone, camera, physical keyboard, proximity sensor and trackball and one or more output devices, such as a speaker and a display. Other possible input and output devices include piezoelectric and other haptic I/O devices. Any of the input or output devices can be internal to, external to or removably attachable with the device 800, such as an external depth camera or a connected television. External input and output devices can communicate with the device 800 via wired or wireless connections.

In addition, the computing device 800 can provide one or more natural user interfaces (NUIs). For example, the operating system 892 or applications 894 can comprise speech recognition logic as part of a voice user interface that allows a user to operate the device 800 via voice commands.

Further, the device 800 can comprise input devices and logic that allows a user to interact with the device 800 via a body hand or face gestures. For example, a user's hand gestures can be detected and interpreted to provide input to a gaming application.

The device 800 can further comprise one or more wireless modems (which could comprise communication devices 884) coupled to one or more antennas to support communication between the system 800 and external devices. The wireless modems can support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM). In addition, the wire less modems can support communication with one or more cellular networks for data and voice communications within a single cellular network, between cellular networks, or between the mobile computing device and a public switched telephone network (PSTN).

The device 800 can further include at least one input/output port (which can be, for example, a USB port IEEE 994 (FireWire) port, and/or RS-232 port) comprising physical connectors, a power supply, a satellite navigation system receiver such as a GPS receiver, a gyroscope, an accelerometer and a compass. A GPS receiver can be coupled to a GPS antenna. The device 800 can further include one or more additional antennas coupled to one or more additional receivers, transmitters and/or transceivers to enable additional functions.

It is to be understood that FIG. 8 illustrates only one exemplary computing device architecture. Computing devices based on alternative architectures can be used to implement technologies described herein. For example, instead of the processors 802 and 804, and the graphics engine 852 being located on discrete integrated circuits, a computing device can comprise a SoC (system-on-a-chip) integrated circuit incorporating multiple processors, a graphics engine and additional components. Further, a computing device can connect elements via bus configurations different from that shown in FIG. 8. Moreover, the illustrated components in FIG. 8 are not required or all-inclusive, as shown components can be removed and other components added in alternative embodiments.

Figure 9:
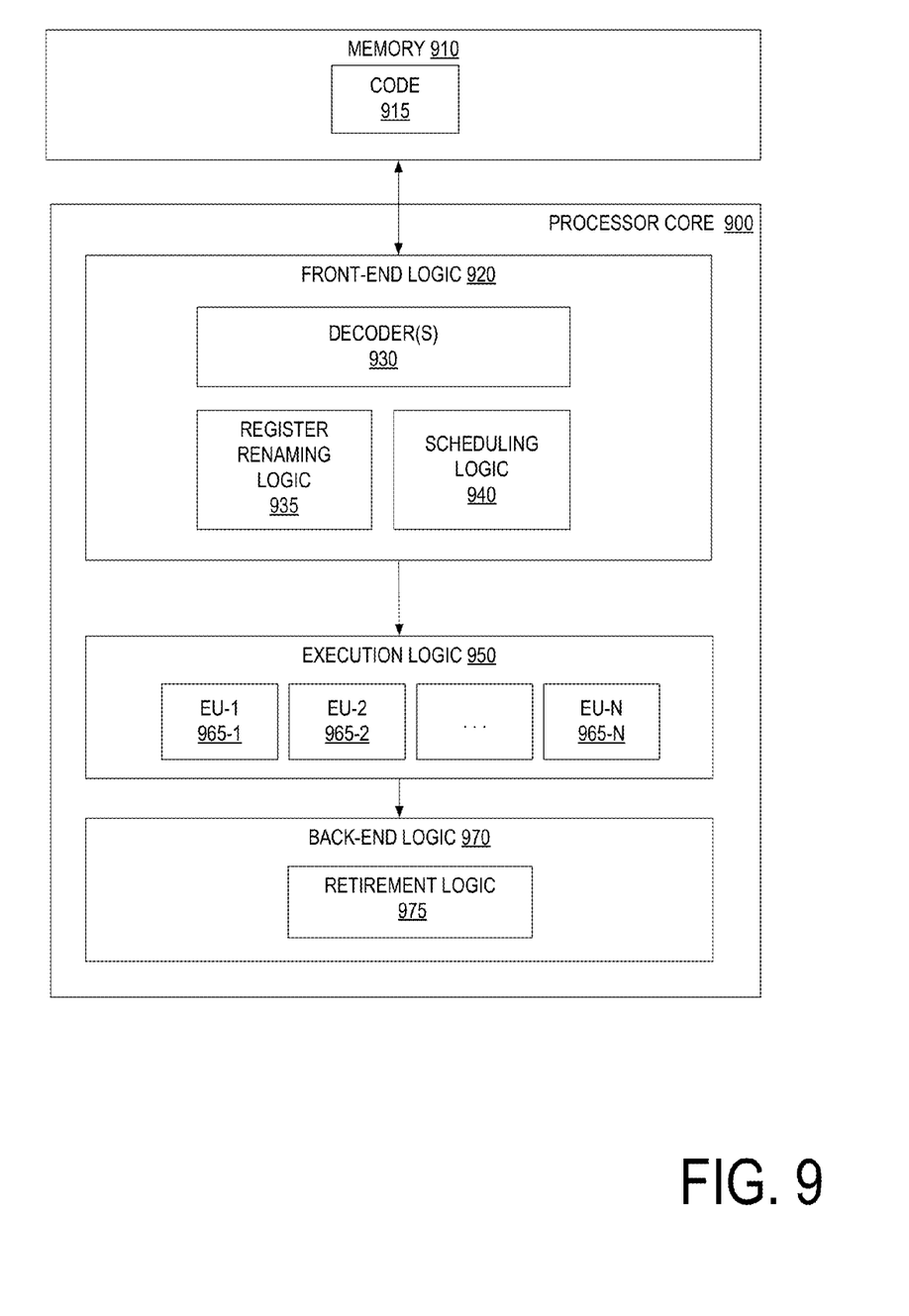
FIG. 9 is a block diagram of an exemplary processor core that can execute instructions as part of implementing technologies described herein.

FIG. 9 is a block diagram of an exemplary processor core 900 to execute computer-executable instructions for implementing technologies described herein. The processor core 900 can be a core for any type of processor, such as a microprocessor, an embedded processor, a digital signal processor (DSP) or a network processor. The processor core 900 can be a single-threaded core or a multithreaded core in that it may include more than one hardware thread context (or "logical processor") per core.

FIG. 9 also illustrates a memory 910 coupled to the processor 900. The memory 910 can be any memory described herein or any other memory known to those of skill in the art. The memory 910 can store computer-executable instruction 915 (code) executable by the processor core 900.

The processor core comprises front-end logic 920 that receives instructions from the memory 910. An instruction can be processed by one or more decoders 930. The decoder 930 can generate as its output a micro operation such as a fixed width micro operation in a predefined format or generate other instructions, microinstructions, or control signals, which reflect the original code instruction. The front-end logic 920 further comprises register renaming logic 935 and scheduling logic 940, which generally allocate resources and queues operations corresponding to converting an instruction for execution.

The processor core 900 further comprises execution logic 950, which comprises one or more execution units (EUs) 965-1 through 965-N. Some processor core embodiments can include a number of execution units dedicated to specific functions or sets of functions. Other embodiments can include only one execution unit or one execution unit that can perform a particular function. The execution logic 950 performs the operations specified by code instructions. After completion of execution of the operations specified by the code instructions, back-end logic 970 retires instructions using retirement logic 975. In some embodiments, the processor core 900 allows out of order execution but requires in-order retirement of instructions. Retirement logic 970 can take a variety of forms as known to those of skill in the art (e.g., re-order buffers or the like).

The processor core 900 is transformed during execution of instructions, at least in terms of the output generated by the decoder 930, hardware registers and tables utilized by the register renaming logic 935, and any registers (not shown) modified by the execution logic 950. Although not illustrated in FIG. 9, a processor can include other elements on an integrated chip with the processor core 900. For example, a processor may include additional elements such as memory control logic, one or more graphics engines, I/O control logic and/or one or more caches.

Referring back to FIG. 1, the network or cloud 150 can provide various cloud-based services that can be used to implement technologies described herein. For example, avatar image series or avatar feature images series or applications that employ avatar animation techniques described herein can be provided by cloud-based services.

Any of the disclosed methods can be implemented as computer-executable instructions or a computer program product. Such instructions can cause a computer to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible computer-readable storage media, such as optical media discs (e.g., DVDs, CDs), volatile memory components (e.g., DRAM, SRAM), or non-volatile memory components (e.g., flash memory, disk drives). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be executed, for example, on a single computing device or in a network environment using one or more network computers. Further, it is to be understood that the disclosed technology is not limited to any specific computer language or program. For instance, the disclosed technologies can be implemented by software written in C++, Java, Perl, JavaScript, Adobe Flash, or any other suitable programming language. Likewise, the disclosed technologies are not limited to any particular computer or type of hardware. Certain details of suitable computers and hardware are known and need not be set forth in detail in this disclosure.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the terms "at least one of" or "one or more of" can mean any combination of the listed terms. For example, the phrases "at least one of A, B or C" or "one or more of A, B or C" can mean A; B; C; A and B; A and C; B and C; or A, B and C.

The disclosed methods, apparatuses and systems are not to be construed as limiting in anyway. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity the attached figures may not show the various ways in which the disclosed methods can be used in conjunction with other methods.

The following examples pertain to further embodiments.

Example 1

An avatar animation method, comprising: selecting one or more predetermined avatar feature images from one or more pluralities of predetermined avatar feature images using a first computing device based at least in part on one or more facial feature parameters determined from video of a user;

generating an avatar image based at least in part on the one more selected predetermined avatar feature images; and providing avatar image information for display.

Example 2

The method of Example 1, further comprising displaying the avatar image at a display of the first computing device.

Example 3

The method of Example 1, wherein the providing comprises sending avatar image information to a second computing device.

Example 4

The method of Example 1, wherein the selecting comprises, for respective ones of the one or more facial feature parameters, mapping the respective facial feature parameter to the selected predetermined avatar feature image belonging to the plurality of predetermined avatar featured images associated with the respective facial feature parameter.

Example 5

The method of Example 4, wherein the mapping is a nonlinear mapping.

Example 6

The method of Example 1, wherein the avatar image is further based at least in part on an avatar background.

Example 7

The method of Example 1, further comprising displaying the avatar image at a display of the second computing device.

Example 8

An avatar animation method, comprising: selecting one or more predetermined avatar feature images from one or more pluralities of predetermined avatar feature images using the computing device based at least in part on one or more facial feature parameters determined from video of a user; generating an avatar image based at least in part on the one more selected predetermined avatar feature images; and providing avatar image information for display.

Example 9

The method of Example 8, further comprising displaying the avatar image at a display of the first computing device.

Example 10

The method of Example 8, wherein the providing comprises sending avatar image information to a second computing device.

Example 11

The method of Example 10, further comprising displaying the avatar image at a display of the second computing device.

Example 12

The method of Example 8, wherein the selecting comprises, for respective ones of the one or more facial feature parameters, mapping the respective facial feature parameter to the selected predetermined avatar feature image belonging to the plurality of predetermined avatar featured images associated with the respective facial feature parameter.

Example 13

The method of Example 8, wherein the mapping is a nonlinear mapping.

Example 14

The method of Example 8, wherein the avatar image is further based at least in part on an avatar background.

Example 15

The method of Example 8, further comprising displaying the avatar image at a display of the second computing device.

Example 16

A method of distributing computer-executable instructions for causing a computing device to perform an avatar animation method, the method comprising: sending computer-readable instructions to a computing device for causing the computing device to a perform an avatar animation method, the method comprising: selecting one or more predetermined avatar feature images from one or more pluralities of predetermined avatar feature images using a first computing device based at least in part on one or more facial feature parameters determined from video of a user; generating an avatar image based at least in part on the one more selected predetermined avatar feature images; and providing avatar image information for display, and storing the computer-readable instructions at the computing device.

Example 17

One or more computer-readable storage media storing computer-executable instructions for causing a computing device to perform any one of the avatar animation methods of Examples 1-16.

Example 18

At least one computing device programmed to perform any one of the avatar animation methods of Examples 1-16.

Example 19

At least one computing device comprising a means to perform any one of the methods of Examples 1-16.

Example 20

An avatar animation method, comprising: tracking one or more facial features in video of a user; and sending avatar image information to a second computing device.

Example 21

The method of Example 20, wherein the avatar image information comprises one or more indices to one or more avatar feature image series or one or more indices to one or more avatar image series.

Example 22

The method of Example 20, where the avatar image information further comprises an avatar background image or an indicator of an avatar background image.

Example 23

One or more computer-readable storage media storing computer-executable instructions for causing a computing device to perform any one of the avatar animation methods of Examples 20-22.

Example 24

At least one computing device programmed to perform any one of the avatar animation methods of Examples 20-22.

Example 25

A computing device, comprising: a facial feature tracking module to track one or more facial features in video of a user; a facial feature parameter module to determine one or more facial feature parameters from the one or more tracked facial features; and an avatar image generation module to select an avatar image from one or more avatar image series based on the determined one or more facial feature parameters and provide the selected avatar image for display.

Example 26

A computing device, comprising: a facial feature tracking module to track one or more facial features in video of a user; a facial feature parameter module to determine one or more facial feature parameters from the one or more tracked facial features; and an avatar image generation module to select one or more avatar feature images from one or more avatar feature images series based on the determined one or more facial feature parameters, generate an avatar image based on the one or more selected avatar feature images, and provide the generated avatar image for display.

We claim:

1. An avatar animation method, comprising:
capturing, by a first computing device, a video of a user;
determining, by the first computing device, one or more facial feature parameters of the user from the video of the user;
selecting, by the first computing device, an avatar feature image from a set of predetermined avatar feature images based on at least one corresponding facial feature parameter of the user, wherein the set of predetermined avatar feature images comprises at least two different predetermined avatar feature images of the same facial feature that were generated prior to determining the one or more facial feature parameters of the user;
generating, by the first computing device, an avatar image based at least in part on the avatar feature image; and
providing avatar image information for display,
wherein selecting the avatar feature image comprises, for respective ones of the one or more facial feature parameters, mapping the respective facial feature parameter to the selected avatar feature image belonging to the set of predetermined avatar feature images associated with the respective facial feature parameter,
wherein mapping the respective facial feature parameter comprises nonlinearly mapping the facial feature parameter to the selected avatar feature image belonging to the set of predetermined avatar featured images associated with the respective facial feature parameter.

2. The method of claim 1, further comprising displaying the avatar image at a display of the first computing device.

3. The method of claim 1, wherein the providing comprises sending avatar image information to a second computing device.

4. The method of claim 3, further comprising displaying the avatar image at a display of the second computing device.

5. The method of claim 1, wherein the avatar image is further based at least in part on an avatar background.

6. One or more non-transitory computer-readable storage media having stored thereon computer-executable instructions that, when executed, cause a computing device to:
capture a video of a user;
determine one or more facial feature parameters of the user from the video of the user;
select an avatar feature image from a set of predetermined avatar feature images based on at least one corresponding facial feature parameter of the user, wherein the set of predetermined avatar feature images comprises at least two different predetermined avatar feature images of the same facial feature that were generated prior to determining the one or more facial feature parameters of the user;
generate an avatar image based at least in part on the avatar feature image; and
provide avatar image information for display,
wherein to select the avatar feature image comprises, for respective ones of the one or more facial feature parameters, to map the respective facial feature parameter to the selected avatar feature image belonging to the set of predetermined avatar feature images associated with the respective facial feature parameter,
wherein to map the respective facial feature parameter comprises to nonlinearly map the facial feature parameter to the selected avatar feature image belonging to the set of predetermined avatar featured images associated with the respective facial feature parameter.

7. The one or more non-transitory computer-readable storage media of claim 6, wherein the computer-executable instructions further cause the computing device to display the avatar image at a display of the first computing device.

8. The one or more non-transitory computer-readable storage media of claim 6, wherein to provide the avatar image information comprises to send the avatar image information to a second computing device.

9. The one or more non-transitory computer-readable storage media of claim 6, wherein the avatar image is further based at least in part on an avatar background.

10. One or more non-transitory computer-readable storage media having stored thereon computer-executable instructions that, when executed, cause a computing device to:
capture a video of a user;
determine one or more facial feature parameters of the user from the video of the user;

select an avatar image from a set of predetermined avatar images based on at least one corresponding facial feature parameter of the user, wherein the set of predetermined avatar images were generated prior to determining the one or more facial feature parameters of the user;

display the selected avatar image at a display of the computing device or send the selected avatar image to a second computing device, wherein the computer-executable instructions further cause the computing device to repeat the selection of an avatar image and the displaying or sending of the selected avatar, such that successive avatar images displayed at the display or sent to the second computing device are adjacent avatar images in the corresponding set of predetermined avatar images.

11. The one or more non-transitory computer-readable storage media of claim 10, wherein to select the avatar image comprises to map the one or more facial feature parameters to the selected avatar image.

12. At least one computing device programmed to perform an avatar animation method, the computing device comprising:

a processor;
a camera; and
a memory, the memory having stored thereon computing instructions that, when executed, cause the computing device to:
capture a video of a user;
determine one or more facial feature parameters of the user from the video of the user;
select an avatar feature image from a set of predetermined avatar feature images based on at least one corresponding facial feature parameter of the user, wherein the set of predetermined avatar feature images comprises at least two different predetermined avatar feature images of the same facial feature that were generated prior to determining the one or more facial feature parameters of the user;
generate an avatar image based at least in part on the avatar feature image; and
display the avatar image at a display of the at least one computing device or send avatar image information to a second computing device,
wherein to select the avatar feature image comprises, for respective ones of the one or more facial feature parameters, to map the respective facial feature parameter to the selected avatar feature image belonging to the set of predetermined avatar feature images associated with the respective facial feature parameter,
wherein to map the respective facial feature parameter comprises to nonlinearly map the facial feature parameter to the selected avatar feature image belonging to the set of predetermined avatar featured images associated with the respective facial feature parameter.

13. The at least one computing device of claim 12, wherein the avatar image is further based at least in part on an avatar background.

14. At least one computing device programmed to perform an avatar animation method, the computing device comprising:

a processor;
a camera; and
a memory, the memory having stored thereon computing instructions that, when executed, cause the computing device to:
capture a video of a user;
determine one or more facial feature parameters of the user from the video of the user;
select an avatar image from a set of predetermined avatar images based on at least one corresponding facial feature parameter of the user, wherein the set of predetermined avatar images were generated prior to determining the one or more facial feature parameters of the user;
display the selected avatar image at a display of the computing device or send the selected avatar image to a second computing device;
wherein the computing instructions further cause the computing device to repeat the selection of an avatar image and the displaying or sending of the selected avatar, such that successive avatar images displayed at the display or sent to the second computing device are adjacent avatar images in the corresponding set of predetermined avatar images.

15. The at least one computing device of claim 14, wherein to select the avatar image comprises to map the one or more facial feature parameters to the selected avatar image.

* * * * *